(No Model.)

L. EMERY & F. B. STEBBINS.
CUTTER HEAD.

No. 286,409. Patented Oct. 9, 1883.

WITNESSES:
Theo. G. Hoster
C. Sedgwick

INVENTOR:
L. Emery
F. B. Stebbins
BY Munn & Co
ATTORNEYS.

UNITED STATES PATENT OFFICE.

LEWIS EMERY AND FRANK B. STEBBINS, OF GALION, OHIO.

CUTTER-HEAD.

SPECIFICATION forming part of Letters Patent No. 286,409, dated October 9, 1883.

Application filed June 21, 1883. (No model.)

*To all whom it may concern:*

Be it known that we, LEWIS EMERY and FRANK B. STEBBINS, of Galion, in the county of Crawford and State of Ohio, have invented certain new and useful Improvements in Cutter-Heads for Panel-Raisers, of which the following is a full, clear, and exact description.

Heretofore in making raised panels for doors and other portions of buildings—that is, panels having raised moldings forming integral portions of the panels—it has been customary to first cut or dress the panels, so as to form the raised moldings, by means of a machine or power-driven rotary cutter head or heads armed with suitable bits, and afterward to bevel or round off or "corner," as it has been termed, by hand, the edges of the panels to provide for their fit within the grooves of the stiles or rails of the door or other article or structure the panels are designed to be applied to.

Our invention has for its object the rounding or beveling of the edges of the panels at the same time that the panels are raised.

Reference is to be had to the accompanying drawings, forming a part of this specification, in which similar letters of reference indicate corresponding parts in all the figures.

Figure 1:
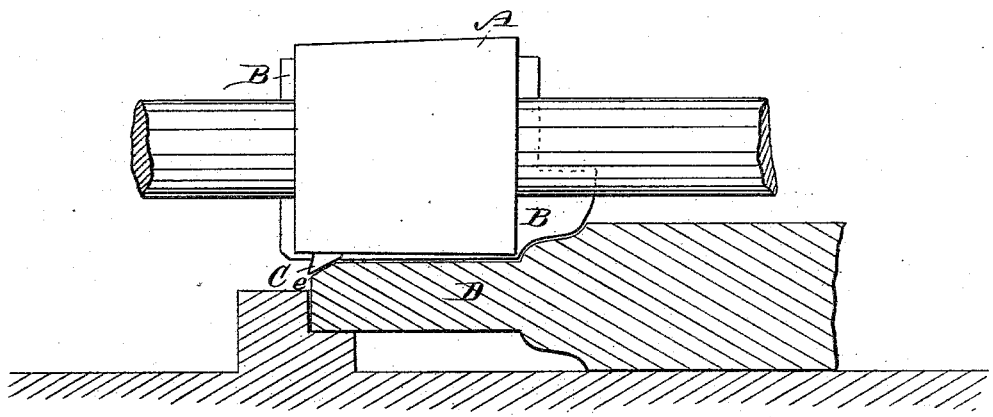
Figure 2:
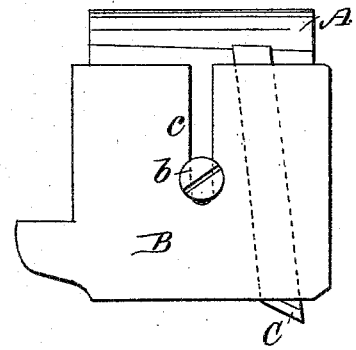

Figure 1 represents a longitudinal view of a rotary cutter-head of a panel-raising machine having our invention applied, and as operating upon a panel, which is shown only in part. Fig. 2 is a similar view to Fig. 1 of the cutter-head, but looking toward the cutter side of the head, and Fig. 3, an end view of the same, a part being broken away.

Figure 3:
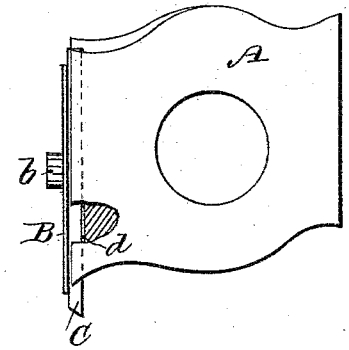

The drawings only represent a small rotary cutter-head, A, armed with a single raising-bit, B, and single edge rounding or beveling bit C; but it will be understood that said bits may be duplicated or repeated on any number of the sides of the head; also, that, instead of a small-sized cutter-head, a large-sized head may be used, armed with either single or double raising-bits, and, if desired, with duplicate edge-beveling bits at suitable distances apart on the same side of the head, for separate operation, accordingly as a wide or narrow raise on the panels is required; but the construction in any case, and without regard to any particular cutter-head, is substantially the same as that shown in the drawings. Thus the panel-raising cutter or bit B may be secured to the head A, and adjusted thereon by one or more screws, $b$, passing through a corresponding number of slots, $c$, in said bit; and the edge beveling or rounding bit C, which may be set at any angle, is arranged upon the head beneath the raising-bit B, and within a groove, $d$, in the head, but so that its outer face or surface lies outside of or beyond the surface of the head on which the raising-bit B rests, as shown in Fig. 3, whereby the raising-bit, when fastened down, serves to hold the edge-beveling bit C in place, and upon slightly loosening the raising-bit B the under or edge beveling bit, C, may be adjusted in or out within its slot, as required.

The advantage of cutting simultaneously, so as to raise the panel and round the edges, is that we save time and labor, while the rounding will be done with greater regularity and more perfect correspondence with the raised molding on the panel.

By the grooved construction of the cutter-head, and combination, with said head, of the raising and edge-beveling bits, as described, the panel D may have its molding raised upon it and its edge $e$ beveled or rounded at the same time and with perfect regularity, and every necessary provision is made for adjusting or changing the bits or cutters, as desired.

We do not abandon or dedicate to the public any patentable features set forth herein and not hereinafter claimed, but reserve the right to claim the same, either in a reissue of any patent that may be granted upon this application or in other applications for Letters Patent that we may make.

Having thus described our invention, we claim as new and desire to secure by Letters Patent—

1. The combination of a panel-raising bit, B, and an edge-rounding bit, C, arranged on the same rotary cutter-head, and adapted to raise the panel and round the edges simultaneously, as described.

2. In a panel-raising bit, the combination of the head A, having slot $c$, screw $b$, and groove $d$, with bits B C, the bit C being arranged under the bit B, whereby on loosening bit B the bit C may be accurately adjusted, as described.

LEWIS EMERY.
FRANK B. STEBBINS.

Witnesses:
R. W. JOHNSTON,
C. W. JOHNSON.